| United States Patent [19] | [11] Patent Number: | 4,525,103 |
|---|---|---|
| Meyer et al. | [45] Date of Patent: | Jun. 25, 1985 |

[54] METHOD OF FIXATION OF ANCHORING BOLTS IN BOREHOLES

[75] Inventors: Frank Meyer, Essen; Wolfgang Cornely, Gladbeck; Hans Mehesch, Essen, all of Fed. Rep. of Germany

[73] Assignee: Bergwerksverband GmbH, Essen, Fed. Rep. of Germany

[21] Appl. No.: 454,479

[22] Filed: Dec. 29, 1982

[30] Foreign Application Priority Data

Jan. 7, 1982 [DE] Fed. Rep. of Germany ....... 3200201

[51] Int. Cl.$^3$ ............... E21B 33/13; E21D 20/02
[52] U.S. Cl. ..................................... 405/261; 166/295
[58] Field of Search ............ 405/259, 260, 261, 263; 166/274, 275, 295; 252/8.55 R

[56] References Cited

U.S. PATENT DOCUMENTS

| 2,867,278 | 1/1959 | Mallory | 166/295 |
|---|---|---|---|
| 2,889,883 | 6/1959 | Santora | 166/295 |
| 3,719,050 | 3/1973 | Asao et al. | 166/295 X |
| 3,925,996 | 12/1975 | Wiggill | 405/261 |
| 4,353,463 | 10/1982 | Seemann | 405/259 X |
| 4,386,877 | 6/1983 | McDowell | 405/261 |
| 4,402,633 | 9/1983 | Self | 166/295 X |

Primary Examiner—Cornelius J. Husar
Assistant Examiner—Nancy J. Stodola
Attorney, Agent, or Firm—Michael J. Striker

[57] ABSTRACT

Method for bonding of anchoring bolts in boreholes, in which an anchoring bolt is pushed with a rotary motion into a twin-chamber cartridge, one compartment of which is filled with a polyisocyanate component and the other one with a hydroxyl component, prepolymer from the conversion of polyisocyanates with one or several difunctional polyols of the molecular weight range 800–5000, preferably 1600–3000, being used as polyisocyanate component.

12 Claims, No Drawings

METHOD OF FIXATION OF ANCHORING BOLTS IN BOREHOLES

BACKGROUND OF THE INVENTION

The invention concerns a method for fixation of anchoring bolts in boreholes.

It is common practice to use unsaturated polyester resins and polyurethanes as reactive resin mass for fixation of anchoring bolts in boreholes. To these ends, the two components used for polyurethane formation, i.e. polyisocyanate and polyol, are contained in two separate chambers of one cartridge made either from plastic foil or an extruded brittle mass (we refer to DE-PS 26 41 776). By introducing the bolt with rotary motion into the boreholes, both chambers are destroyed and both components are mixed, so that they react with each other to form polyurethane. According to DE-AS 12 05 038 and DE-AS 17 84 458, the polyurethane resin takes two hours for assuming the consistence of a jelly, and 5 to 6 hours for solidifcation. For practical reasons, however, much shorter gelatination and hardening times are required, since until gelatination the anchoring bolt needs to be secured in upwardly directed boreholes against falling-out, and since the whole system needs to develop carrying capacity as soon as possible, particularly for tunnelling and mining.

DE-AS 27 05 751 describes the system which avoids this disadvantage, with polyols containing tertiary amino groups being used as hydroxyl components, which at the same time exert catalytic effects, so that gelatination and hardening times of less than one minute are achieved. According to claim 3 of this disclosure, however, water addition is limited to 0.5% by weight relative to the polyol. If more water is added, e.g. from outside by moist boreholes, the blend foams up to such an extent that the hardened foam produced will not stand serious tractive efforts.

SUMMARY OF THE INVENTION

This invention is based on the task of providing a method of the above described type for use also in wet boreholes, while at the same time obtaining well controlled, and in particular short, gelatination and hardening times.

By this invention, these requirements are complied with in that prepolymers made from polyisocyanates and one or several polyols of the molecular weight range 80–5000, preferably 1600–3000, are used instead of the polyisocyanate component.

Earlier in DE-OS 24 48 958, the risks caused by water to the sealing of geologic formations were explained, and prepolymers from toluylenediisocyanate or blends made up of diphenylmethanediisocyanate with its isomers and higher nuclear components, i.e. raw MDI, are recommended as isocyanate component on the one hand, and, on the other hand, hydroxyl components of the molecular weight range from 400 to 600. For overcoming the negative influence of water, certain accelerators and foam stabilizers are proposed to be added to the system. This method implies the reactive resin being injected directly into the geologic formations and this means that the task to bond anchoring bolts in boreholes is not accomplished. Prepolymers from toluylenediisocyanate are out of question in practice anyhow, for reasons of toxicity. Recommendations of hydroxyl components for its make-up cannot be read from said DE-OS.

A considerable advantage of the method covered by the present invention consists in the water serving totally or partially as hydroxyl component, so that excellent bonding of anchoring bolts is obtained also in moist boreholes. In comparison, polyester resin and hardener filled twin-chamber cartridges fail, even though these cartridges, in dry boreholes, achieved up to present the highest anchoring strength.

For technical reasons and for the sake of hygiene, however, wet drilling—with simultaneous water injection into the end of the borehole—has been preferred to dry drilling for some time, so that the use of polyester resin filled cartridges is hardly possible anymore, above all since these cartridges contain styrene in larger quantities, which means hazards to human health.

By the use of water or aqueous solutions as hydroxyl component, another advantage is achieved in that the resin in the course of polyurethane formation foams up to some extent, but not too strongly because of the prepolymer used as isocyanate component. By the volume increase thus achieved, a better closing shape of the resin mass against the borehole walls is obtained, and this is particularly important in case of lacking dimensional accuracy of boreholes and in case of fractured strata.

For use as polyisocyanate component for making up the prepolymer, the raw polyisocyanates—known in polyurethane chemistry and liquid at ambient temperature—as produced by aniline/formaldehyde condensation and subsequent phosgenation, may be considered. Also the modification products of this kind of polyisocyanate blends of the isocyanate family, e.g. any derivatives thereof containing carbodiimide groups, biurete groups, urethane groups, or allophanate groups are suited. Such polyisocyanates have been described e.g. by Ullmann, Verlag Chemie, 4. Auflage, Band 19, pp. 303–305.

The polyisocyanate blends, liquid at ambient temperature and produced by phosgenation of aniline/formaldehyde condensation, which consist essentially of isomeric diisocyanate-diphenyl-methanes, are particularly well suited since these isocyanates exhibit an average functionality between 2.5 and 3.5, preferably 2.2 to 2.8, and since functionality in this range is desirable in view of good networking with the linear polyols.

Polyols used for production of the prepolymers are difunctional polyols with average molecular weights between 800 and 5000, preferably 1600 and 3000, i.e. long-chained difunctional polyols. This corresponds to an OH number between 140 and 22, preferably within the range between 70 and 37. The propylene oxide-, ethylene oxide-, or the blended propylene oxide/ethylene-polyether-polyols, the polymerization of which was primed by water or a low-molecular diol, as e.g. ethylene glycol, propane-1,2-diol, propane-1,3-diol, or butane-1,4-diol, may be considered. The above mentioned polyisocyanates and polyether-polyols undergo prepolymerization by known processes to form polyisocyanate-prepolymers (Vieweg-Hochtlen, Kunststoff-Handbuch, VIII, p. 447 ff). In this process, polyisocyanates in an excess ratio to polyether-polyols are used in order to keep the viscosity of the resulting polyisocyanate-prepolymers within the limits of handleability. The viscosity of the polyisocyanate-prepolymers should be <50,000 m Pa. s, preferably <10,000 m Pa. s. If, therefore, tri-functional and higher functional polyols are added, e.g. in quantities >10% by weight, the viscosity increases to an extent that no really usable results can be obtained with the twin-chamber cartridge system.

Polyols with OH numbers of 250 to 2000, preferably from 1000 to 1850, are suited as hydroxyl component for the reactive-resin mass according to this invention. These polyols assure rapid and thorough hardening of the resin. Short-chain polyols such as e.g. ethyleneglycol, diethylene-glycol, triethylene-glycol, glycerine, propane-1,2-diol, propane-1,3-diol, butane-1,4-diol are particularly well suited. Also solid polyols such as e.g. pentaerythrite, sorbite, mannite, fructose, galactose, cane sugar, molasses, starch, hydroxyethylene-cellulose, and polyvinyl-alchol, dissolved in the above mentioned short-chain polyols or in water, are suited for a use as hydroxyl component. Even water on its own may be considered as hydroxyl component.

According to the method covered by this invention, the prepolymer and/or the hydroxyl components may contain tertiary amine, or the hydroxyl component may be a polyol containing amino groups.

Particularly well suited are e.g. polyols containing one or several amino groups. As examples may be quoted tri-ethanolamine di-ethanolamine alkoxylation products of ammonia, tri-ethynolamine, or ethylenediamines with epoxides such as e.g. ethylene oxide and propylene oxide.

Suitable tertiary amines are e.g. N,N-di-methylcyclohexylamine, tri-ethylamine, di-methyl-ethanolamine, tri-butylamine, diazobicyclo-(2,2,2)-octane, N-methyl-morpholine, N,N,N',N'-tetramethyl-ethylenediamine. It is useful to add quantities of these amines in the range between 0.2 and 5% by weight.

According to the method covered by this invention one or each of both components may always contain an organo-metallic combination as catalyst for the polyurethane reaction.

Suitable organo-metallic combinations are salts of organo acids with metals of the groups IIb and IVb of the periodic system, and transition metals, in particular tin combinations such as e.g. tin-dilaurate, tin-diethylhexoate, tin-dinaphthenate, tin-distearate, dibutyl-tin-dilaurate, dimethyl-tin-dilaurate, dioctyl-tin-distearate, dibutyl-tin-distearate and other combinations according to the general formulae $Sn(OOC-R)_2$ and $R'_2Sn(OOCR)_2$, where R and R' stand for aliphatic residues. It is generally useful to add 0–2% by weight of these combinations to the reactive resin mass.

For better adhesive properties for the dowel or the anchoring rod it is advantageous to add inert filler to the hydroxyl component and/or the prepolymer component. As fillers may be used e.g. ground limestone, quartz powder, heavy spar, or glass fibers. Filler proportions of 10–80% by weight, preferably 20–70% by weight relative to the total content of the cartridge may be considered.

Due to the adjustable short gelatination and hardening periods of the mixed components it is possible and advisable to use automatic drilling and bolt setting equipment. For the same reasons, a cartridge covered by this invention is particularly well suited for being used in upwardly directed boreholes since the resin from the destroyed cartridge can no longer run out of the borehole, which means that safety risks and material losses can be avoided.

The introduction of the reactive resin mass into the borehole is assured, as stated before, by means of a twin-chamber cartridge in the one chamber of which the prepolymer component is contained and in the other one of which is the hydroxyl component, the quantity of which corresponds to 1–25% by weight relative to the prepolymer quantity. When introducing the anchoring rod or the dowel, a rotary movement destroys the cartridge and at the same time both components are mixed to make up the reactive resin.

A cartridge may possibly be devised which is filled with a number of destructible capsules containing one or both components and the walls of which are not penetrated by these prior to destruction. Also individual cartridges filled with prepolymer on the one hand and with a hydroxyl component on the other hand could be considered; one cartridge of each kind may then be introduced into one borehole thus forming a functional unit corresponding to a twin-chamber cartridge. In any case, the volume of the cartridge containing the prepolymer corresponds to 65–95% by volume of the total cartridge.

The novel features which are considered characteristic for the invention are set forth in particular in the appended claims. The invention itself, however, both as to its construction and its method of operation, together with additional objects and advantages thereof, will be best understood from the following description of specific embodiments.

DESCRIPTION OF THE PREFERRED EMBODIMENTS

EXAMPLE 1

At a constant temperature of 40° C., 500 g of a polypropylene-glycol based on propane-1,2-diol with an OH number of 58 and an average molecular weight of 2000 are added dropwise—a protective gas atmosphere—to 1000 g of a polyisocyanate based on aniline-formaldehyde condensates with a viscosity of 220 m Pa. s. and an NCO content of 31%, and the blend is then stirred at 60° C. over a 12 hour period. The prepolymer produced in this way exhibits an NCO content of 19% and a viscosity of 2,450 m Pa. s.

100 g of this prepolymer and 14 g of ethylene-glycol (OH number 1820) are filled into separate chambers of a twin-chamber cartridge made from 0.1 mm thick polyamide foil. The length of this cartridge is 26 cm and its diameter 24 mm.

After introducing this cartridge into a wet borehole with a diameter of 28 mm and a depth of 2 m it is destroyed by an anchoring bolt introduced with a rotary movement. The gelatination time of the resin made up from the mixed components is 50 seconds. After 24 hours a tractive effort of 23 tons is required to pull the anchoring bolt from the borehole.

For comparison, the cartridge is filled with a prepolymer produced by polyaddition of 1000 g of the above poly-isocyanate with 500 g of polypropylene-glycol (OH number 260) with an average molecular weight of 470. This prepolymer exhibits an NCO content of 12.9% and a viscosity of 900,000 m Pa. s.

100 g of this prepolymer and 10 g of ethylene-glycol are filled into the separate chambers of a twin-chamber cartridge as described above and used in the same way for bonding an anchoring bolt in a wet borehole. Gelatination time of the resin made up from the mixed components is 40 seconds. After 24 hours a tractive effort of 8 tons is sufficient for pulling the anchoring bolt from the borehole.

For comparison with the method covered by DE-PS 27 05 751, one chamber of the cartridge is filled with 100 g of the above described polyisocyanate and another chamber with 40 g of a polyol (OH number 640, average molecular weight of 310) made up from ethylene-diamine and propylene-oxide, mixed with 0.5 parts by weight of water. Gelatination time of the resin made up in the wet borehole is one minute. After 24 hours the anchoring bolt could be pulled from the borehole by a tractive effort of only 6 tons.

EXAMPLE 2

In an atmosphere of protective gas and at a constant temperature of 40° C., 1000 g of a polypropylene-glycol based on ethylene-glycol (OH number 58, average molecular weight 2000) are added dropwise to 1000 g of a polyisocyanate based on aniline-formaldehyde condensates with a viscosity of 125 m Pa. s and an NCO content of 31%, and subsequently stirred over 12 hours at 60° C. The prepolymer produced in this way exhibits an NCO content of 13% and a viscosity of 10,000 m Pa. s.

80 g of this prepolymer, blended with 50 g of quartz powder, is filled into one chamber of a twin-chamber cartridge made from 0.1 mm thick polyamide foil and 16 g of a 50% aqueous glycerine solution into the other one. The cartridge has a diameter of 24 mm and a length of 26 cm.

After introducing the cartridge into a wet borehole of 28 mm of diameter and 2 m of depth, it is destroyed by an anchoring rod introduced with a rotary movement. The gelatination time of the resin made up from the mixed components is 50 seconds. After 24 hours a tractive effort of 22 tons is required for pulling the anchoring rod from the borehole.

EXAMPLE 3

In an atmosphere of a protective gas and at a constant temperature of 40° C., 750 g of a polypropylene-glycol based on butane-1,3-diol (OH number 58, average molecular weight of 2000) are added dropwise to 1000 g of a polyisocyanate based on aniline-formaldehyde condensates with a viscosity of 125 m Pa. s and an NCO content of 31%, and subsequently stirred over 12 hours at 60° C. The prepolymer produced in this way exhibits an NCO content of 17% and a viscosity of 5,700 m Pa. s.

60 g of this prepolymer, blended with 90 g of stone powder, are filled into one chamber of a twin-chamber cartridge made from an extrudable mass as per DE-PS 26 41 776, and 13 g of a 70% molasses concentration containing 2 g of tri-ethylene-diamine into the other one. This cartridge has a diameter of 24 mm and a length of 26 cm.

After introduction of the cartridge into a wet borehole of 28 mm diameter and 2 m depth the cartridge is destroyed by an anchoring bolt introduced with a rotary movement. The resin made up from the blended components gelatinates within 50 seconds. After 24 hours, a tractive effort of 20 tons is required for pulling the anchoring bolt from the borehole.

EXAMPLE 4

In an atmosphere of protective gas and at a constant temperature of 40° C., 1000 g of a polypropylene-glycol (OH number 58, average molecular weight of 2000) are added dropwise to 1000 g of a polyisocyanate based on aniline-formaldehyde condensates with a viscosity of 125 m Pa. s, and an NCO content of 31%, and subsequently stirred over 12 hours at 60° C. The prepolymer used in this way exhibits an NCO content of 19% and a viscosity of 10,000 m Pa. s.

80 g of this prepolymer, with an addition of 30 g of fly ash, are filled into one chamber of a twin-chamber cartridge made from glass tubes (1 mm of wall thickness), as per U.S. Pat. No. 3,108,443, and 14 g of a 90% aqueous tri-ethanol-amine solution into the other chamber. The cartridge has a diameter of 4 mm and a length of 26 cm.

After introduction of the cartridge into a wet borehole with a diameter of 28 mm and a depth of 2 m, the cartridge is destroyed by an anchoring bolt introduced with a rotary movement. A resin made up from the mixed components gelatinates within 100 seconds. After 24 hours a tractive effort of 25 tons is required for pulling the anchoring bolt from the borehole.

EXAMPLE 5

In an atmosphere of a protective gas and at a constant temperature of 40° C., 100 g of a polypropylene-glycol (OH number 58, average molecular weight of 2000) are added dropwise to 1000 g of a polyisocyanate based on aniline-formaldehyde condensates with a viscosity of 125 m Pa. s and an NCO content of 31%, and subsequently stirred over 12 hours at 60° C. The prepolymer produced in this way exhibits an NCO content of 19% and a viscosity of 10,000 m Pa. s.

100 g of this prepolymer are filled into one chamber of a twin-chamber cartridge made from 0.1 mm thick polyamide foil and 1 g of tri-ethylene-diamine dissolved in 20 g of water into the other chamber. The diameter of this cartridge is 24 mm and its length 26 mm.

After introduction into a dry borehole of 28 mm diameter and 2 m depth, the cartridge is destroyed by an anchoring bolt introduced with a rotary movement. The resin made up from the blended components gelatinates within 50 seconds. After 24 hours, a tractive force of 24 tons is required for pulling the anchoring bolt from the borehole.

It will be understood that each of the elements described above, or two or more together, may also find a useful application in other types of resin masses differing from the types described above.

While the invention has been illustrated and described as embodied in a method of fixation of anchoring bolts in boreholes, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a method for bonding anchoring bolts in boreholes of the type in which an anchoring bolt is introduced into a twin-chamber cartridge, one chamber of which is filled with polyisocyanates and the other one with a hydroxyl component, the improvement comprising using prepolymers having viscosity below 50,000 m Pa. s from the conversion of polyisocyanates, said polyisocyanates consisting of phosgenation products from aniline formaldehyde condensates, with one or several difunctional polyols of the molecular weight range 1600–3000, as polyisocyanate component.

2. Method as per claim 1, wherein said hydroxyl component consists of polyols with OH numbers of 250–2000.

3. Method as per claim 1, wherein said hydroxyl component consists of polyols with OH numbers of 1000–1850.

4. Method as per claim 1, wherein aqueous solutions of solid or liquid polyols are used as hydroxyl component.

5. Method as per claim 1, wherein one of both components contains a tertiary amine.

6. Method as per claim 1, wherein the hydroxyl component is constituted by a polyol containing amino groups.

7. Method as per claim 1, wherein one or both components contain an organo-metallic combination as catalyst for the polyurethane reaction.

8. Method as per claim 1, wherein inert fillers are added to the hydroxyl component and/or the prepolymer component.

9. Twin-chamber cartridge for practice of the method as per claim 1, comprising one chamber filled with prepolymer and another chamber filled with a quantity of 5–25% by weight, relative to the prepolymer, of a hydroxyl component.

10. Cartridge as per claim 9, further comprising 10–80% by weight, relative to the total cartridge filling, of an inert filler added to the prepolymer and/or the hydroxyl component.

11. Cartridge as per claim 10, wherein 20–70% by weight of inert filler are added.

12. Twin-chamber cartridge as per claim 9 wherein the volume of the one chamber which is to contain the prepolymer comes to 65–95% of the total volume of both chambers.

* * * * *